United States Patent
Eggleston

(10) Patent No.: US 8,082,689 B2
(45) Date of Patent: Dec. 27, 2011

(54) INTERLOCKING THREE DIMENSIONAL SILHOUETTE AVIAN DECOY

(76) Inventor: Matthew Eggleston, Watertown, NY (US)

(*) Notice: Subject to any disclaimer, the term of this patent is extended or adjusted under 35 U.S.C. 154(b) by 0 days.

(21) Appl. No.: 12/433,243

(22) Filed: Apr. 30, 2009

(65) Prior Publication Data

US 2010/0275499 A1 Nov. 4, 2010

(51) Int. Cl.
*A01M 31/06* (2006.01)
(52) U.S. Cl. .................................................. 43/3; 43/2
(58) Field of Classification Search ................ 43/3, 2; 446/101, 387, 388, 487, 488, 34, 88, 108, 446/114
See application file for complete search history.

(56) References Cited

U.S. PATENT DOCUMENTS

| | | | |
|---|---|---|---|
| 311,877 A * | 2/1885 | Danz, Jr. | 43/3 |
| 722,682 A * | 3/1903 | Dills | 43/3 |
| 735,314 A * | 8/1903 | Syms | 43/3 |
| 977,787 A * | 12/1910 | Davis | 43/3 |
| 1,473,612 A * | 11/1923 | Dewey | 43/3 |
| 1,948,624 A | 2/1934 | Lyons at al. | |
| 2,314,744 A * | 3/1943 | Warren | 446/387 |
| 2,478,585 A * | 8/1949 | Kouba | 43/3 |
| 2,535,445 A * | 12/1950 | Miller et al. | 43/3 |
| 2,536,338 A * | 1/1951 | Withey et al. | 43/3 |
| 2,639,534 A * | 5/1953 | Stossel | 43/3 |
| 2,706,357 A * | 4/1955 | Nigh et al. | 43/3 |
| 2,763,952 A * | 9/1956 | Bruce | 43/3 |
| 2,783,572 A * | 3/1957 | Rohan | 43/3 |
| 3,212,214 A * | 10/1965 | Patterson | 446/388 |
| 3,707,798 A * | 1/1973 | Tryon | 43/3 |
| 4,642,062 A * | 2/1987 | Dorffler | 446/68 |
| 4,666,163 A * | 5/1987 | Hirschfeld | 446/108 |
| 4,789,370 A * | 12/1988 | Ellefson | 446/114 |
| 4,976,652 A * | 12/1990 | Schwartz | 446/488 |
| 5,003,722 A * | 4/1991 | Berkley et al. | 43/3 |
| 5,392,554 A * | 2/1995 | Farstad et al. | 43/3 |
| 5,682,702 A * | 11/1997 | McKnight et al. | 43/3 |
| 5,741,168 A * | 4/1998 | Chen | 446/66 |
| 5,832,650 A * | 11/1998 | Franceschini | 43/3 |
| 5,910,038 A * | 6/1999 | Zheng | 446/114 |
| 6,082,036 A * | 7/2000 | Cripe | 43/3 |
| 6,115,953 A * | 9/2000 | Wise | 43/3 |
| D475,759 S | 6/2003 | Salato | |
| 6,574,904 B1 * | 6/2003 | Fencel et al. | 43/3 |
| 6,604,979 B1 * | 8/2003 | Liu | 446/387 |
| 6,626,732 B1 * | 9/2003 | Chung | 446/114 |
| 6,665,975 B2 * | 12/2003 | Porter | 43/3 |
| 6,857,215 B1 | 2/2005 | Rickrode | |
| 6,874,270 B2 * | 4/2005 | Lorenz | 43/3 |
| 7,272,906 B1 | 9/2007 | Spaulding, Sr. | |
| 7,318,764 B2 * | 1/2008 | Elias | 446/108 |

(Continued)

*Primary Examiner* — Darren W Ark
(74) *Attorney, Agent, or Firm* — Harris Beach PLLC

(57) ABSTRACT

A decoy is comprised of a pair of planar members, one being a body member to be vertically orientated and the other being a wing member to be horizontally orientated. The two members are interconnected by corresponding openings in the body portion and tabs in the wing portion, respectively, to thereby facilitate ease of assembly and disassembly. The members are comprised of a light-weight, semi-rigid material which are adorned with artistic depictions of the represented species. A rotatable support member and the light-weight material allows for the assembled decoy to rotate with the wind to thereby present a life like appearance. A support stake, separate from the decoy structure, includes a socket at its top so that the stake can be inserted into the ground and then the downwardly extending decoy pin can be rotatably inserted into the socket.

7 Claims, 3 Drawing Sheets

U.S. PATENT DOCUMENTS

| | | | |
|---|---|---|---|
| 7,337,575 B2 * | 3/2008 | Hulley et al. | 43/3 |
| 7,389,606 B2 * | 6/2008 | McLeod | 43/2 |
| 7,409,793 B1 * | 8/2008 | Schwarz | 43/3 |
| 2004/0025400 A1 | 2/2004 | Salato | |
| 2004/0237373 A1 * | 12/2004 | Coleman | 43/3 |
| 2007/0062093 A1 | 3/2007 | Hess | |
| 2007/0180753 A1 | 8/2007 | Zink et al. | |
| 2009/0025269 A1 | 1/2009 | Hulley | |
| 2009/0241401 A1 * | 10/2009 | Price | 43/3 |

* cited by examiner

US 8,082,689 B2

INTERLOCKING THREE DIMENSIONAL SILHOUETTE AVIAN DECOY

TECHNICAL FIELD

This invention relates generally to bird decoys and, more particularly, to an interlocking three dimensional silhouette game decoy that is so constructed as to be moveable by the wind to simulate realistic movement of the bird.

BACKGROUND OF THE INVENTION

Decoys have long been used to visually simulate the presence of wildlife for various purposes such as game hunting, culling predator and nuisance species, and observation.

The most common decoy type is that of a molded three dimensional, i.e. "full bodied" decoy. While such a decoy can be manufactured such that it looks sufficiently realistic, it is bulky, difficult to transport and set up, and is relatively expensive. That is, since it is desirable to use a relatively large number of decoys, i.e. in the range of 50 to 100, to maximum the chances of attracting game, it may take hours to put up the decoys in the desired location and then to take them down at the end of the day. Further, such a full bodied decoy, when used on land, is unable to mimic lifelike movement. While movement of a full bodied decoy may be obtained as shown in US Patent Publication 2007/0180753, it is accomplished only by way of greater expense and a complicated structure which further extends the set up procedure and time.

Another type of decoy is a vertically disposed, two dimensional silhouette that is easier to store and carry into the field. However, such a decoy lacks the necessary realistic appearance of a live bird. Additionally, many prior art decoys lack the strength and durability needed for repeated use in the field. Such a decoy is shown in U.S. Pat. No. 6,874,270.

A third type of decoy is one which is made up of cooperating vertical and horizontal sections that are assembled to provide a three dimensional representation of a bird. Examples are U.S. Pat. Nos. 2,783,592, 2,763,952, and 3,707, 798. Such structures are generally made of a non-flexible material such as wood. Accordingly, they tend to be bulky to transport and assemble, and when erected, they tend not to move in a realistic manner.

For land based decoys, it is common to provide a support rod that is attached to the decoy and inserted into the ground. Such a rod is shown in U.S. Pat. No. 6,874,270. When the stake is so combined with the decoy structure, it complicates the transport process, and further, it may be difficult to plant the stake by handling the decoy itself, particularly in hard ground. Further, unless provision is made for the decoy to rotate on the stake, such as shown in U.S. Pat. No. 5,003,722, life-like movement is difficult to obtain.

DISCLOSURE OF THE INVENTION

Briefly, in accordance with one aspect of the invention, a decoy is comprised of two planar members; a vertically disposed body member and a horizontally disposed wing member that are interconnected by corresponding tabs and openings so that transport and assembly is easily facilitated.

By another aspect of the invention, the main body and wing members are composed of a lightweight semi-rigid material that facilitates the assembly of the tabs into openings and further facilitates realistic movement by way of the wind.

By still another aspect of the invention, the decoy body includes a depending pin which is adapted to fit into a socket at the top of a stake such that the stake can be independently inserted into the ground, with the decoy then being inserted thereafter.

In the drawings as hereinafter described, a preferred and modified embodiments are depicted; however, various other modifications and alternate constructions can be made thereto without departing from the scope of the invention.

DETAILED DESCRIPTION OF THE INVENTION

Figure 1:
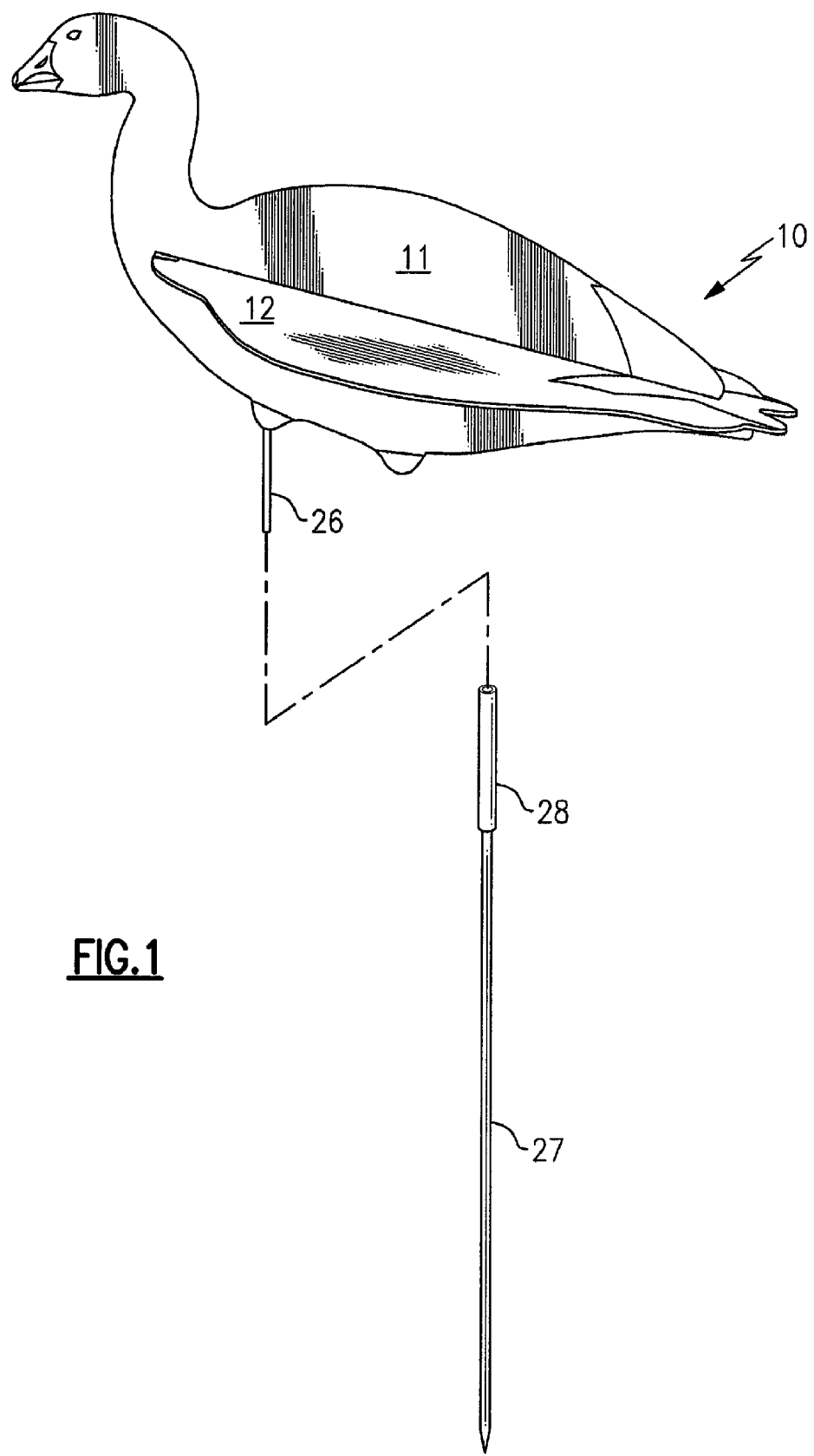
FIG. 1 is a perspective view of one embodiment of the present invention in an assembled condition.
Figure 2:
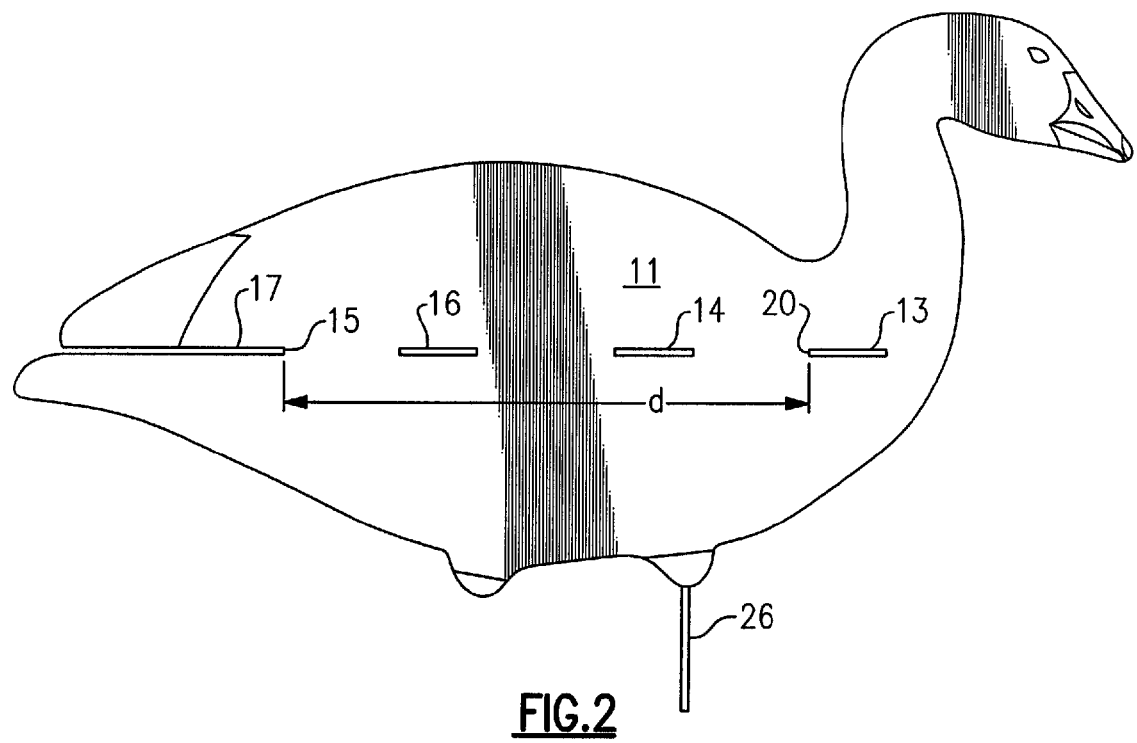
FIG. 2 is a side, dorsal view of a vertically disposed portion thereof.
Figure 3:
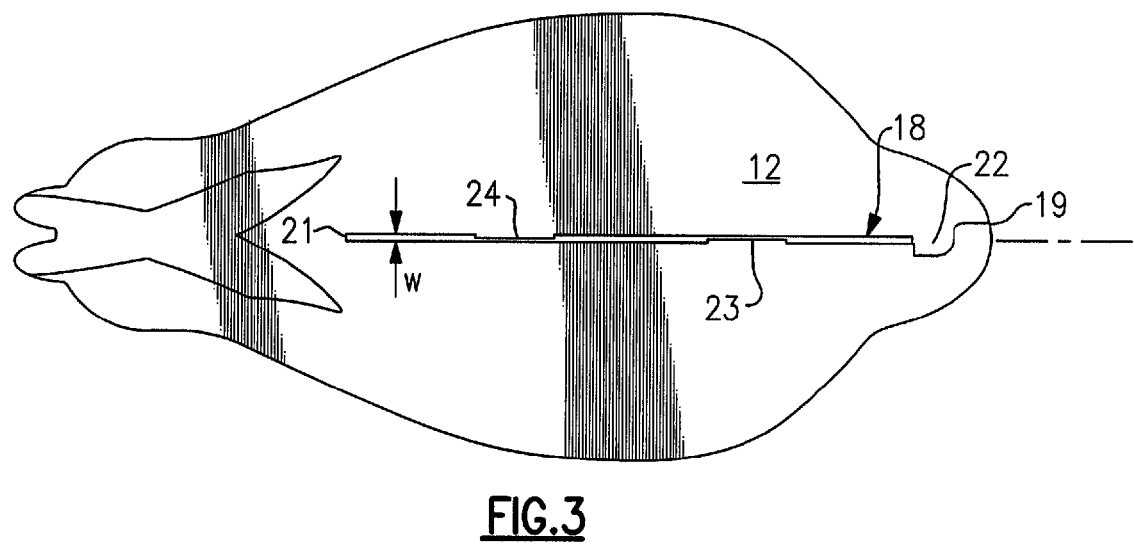
FIG. 3 is a top dorsal view of a horizontally disposed portion thereof.

Referring now to FIGS. 1-3, the invention is shown in accordance with one embodiment, with FIG. 1 showing the assembled decoy and FIGS. 2 and 3 showing the respective vertically and horizontally oriented portions thereof.

As will be seen, the body member 11 shown in FIG. 2 is a planar member that is designed to be vertically oriented and formed to represent a side view of a particular bird, such as a goose as shown. Similarly, the wing member 12 shown in FIG. 3 is a planar member which is seen in a top view and appears to be a top view of the particular fowl type. When assembled together as shown in FIG. 1, it gives the appearance, from all angles of approach, of a bird of the particular type.

Referring to FIG. 2, the body member 11 is shown to include a plurality of longitudinally extending openings 13, 14 and 16 as well as a slot 17 which extends forwardly from the rear end of the wing member. These openings and the slot 17 are adapted to receive portions of the wing member 12 as will be described, and the two members are assembled as shown in FIG. 1. The distance between the inner end 15 of the slot 17 and the inner end 20 of the forward opening 13 is represented by the dimension "d".

As shown in FIG. 3, the wing member 12 includes a longitudinally extending slit 18 which extends from a point 19 at the forward end of the wing member 12 to a point 21, toward the rear end of the wing member 12. As will be understood, the slit 18 allows the two sides of the wing member 12 to be slightly separated and placed on either side of the body member 11 for purposes of assembly. The length of the slit 18 between its ends 19 and 21 must exceed the dimension "d" in FIG. 2.

Partially formed by the slit 18 is the plurality of tabs 22, 23 and 24 which extend transversely into or beyond the plane of the centerline C/L as shown. That is, tab 22 extends from the left side (as looking down) and across the centerline. The tab 23 extends from the right side but to a lesser extent than tab 22 such that it does not substantially cross the centerline. Tab 3 extends from the left side and, similarly, does not appreciably cross the centerline. The shapes, sizes, and locations of the tabs 22, 23 and 24 can be varied as desired so long as they are adapted to correspond with the number, shape, size and positioning of the openings 13, 14 and 16 of the body member 11. The width "w" of the portion of the slit 18 between the tabs is sufficient to contain the width of the body member 11. Further, it should be understood that, in order for the two members to be properly assembled together, the distance between the tab 22 and the slit end 21 must exceed the dimension "d".

Assembly of the body member 11 with the wing member 12 is accomplished by first slightly separating the left and right sides of the wing member 12 as facilitated by the slit 18. The rear point 21 of the slit 18 is then made to enter the slot 17 of the body member 11, and the tabs 22, 23 and 24 are inserted into the respective openings 13, 14 and 16 of the body member 11. When in that assembled condition as shown in FIG. 1, they will remain in that assembled condition under normal weather and environmental conditions to be used as a decoy which represents a three-dimensional view of the particular fowl of choice. When use has been completed at the end of the day, the components can then be easily disassembled by reversing the above process and then be stacked together for easy transport.

Both the body member 11 and the wing member 12 can be adorned with artistic depictions of the represented species coat and color from a perspective appropriate to produce three-dimensional representation of the simulated species. That is, they may be adorned with photographic reproductions of the simulated species, or the color pattern or coat can be simulated by other means such as digital, photographic or flocking. The body member 11 will have such markings adorned on both its sides, while the wing member 12 will only need to have them applied to the top side.

The planar body member 11 and wing member 12 are constructed from a lightweight, rather flexible, semi-rigid material such as corrugated plastic, also known as "signboard" or "Coroplast". Such a material is not only inexpensive and lightweight for purposes of assembly, disassembly and transport, but also facilitates the movement by the wind so as to appear to be a realistic movement of the particular bird. This movement is further facilitated by the manner in which the assembled decoy is mounted.

As shown in FIGS. 1 and 2, the body member 11 includes a downwardly extending pin 26 rigidly attached thereto. Separately, a stake 27 with a cylindrical socket 28 fastened to its upper end is provided. The stake and socket 27, 28 can be separately inserted into the ground by hand or by way of a hammer or the like. Following that, the pin 26 with its attached decoy assembly can then be inserted into the socket in a loose fit manner such that, as the wind direction changes, the pin 26 will rotate within the socket 28, such that the assembled decoy structure will turn so as to always face into the wind, which is a realistic position for a typical bird.

Figure 4:
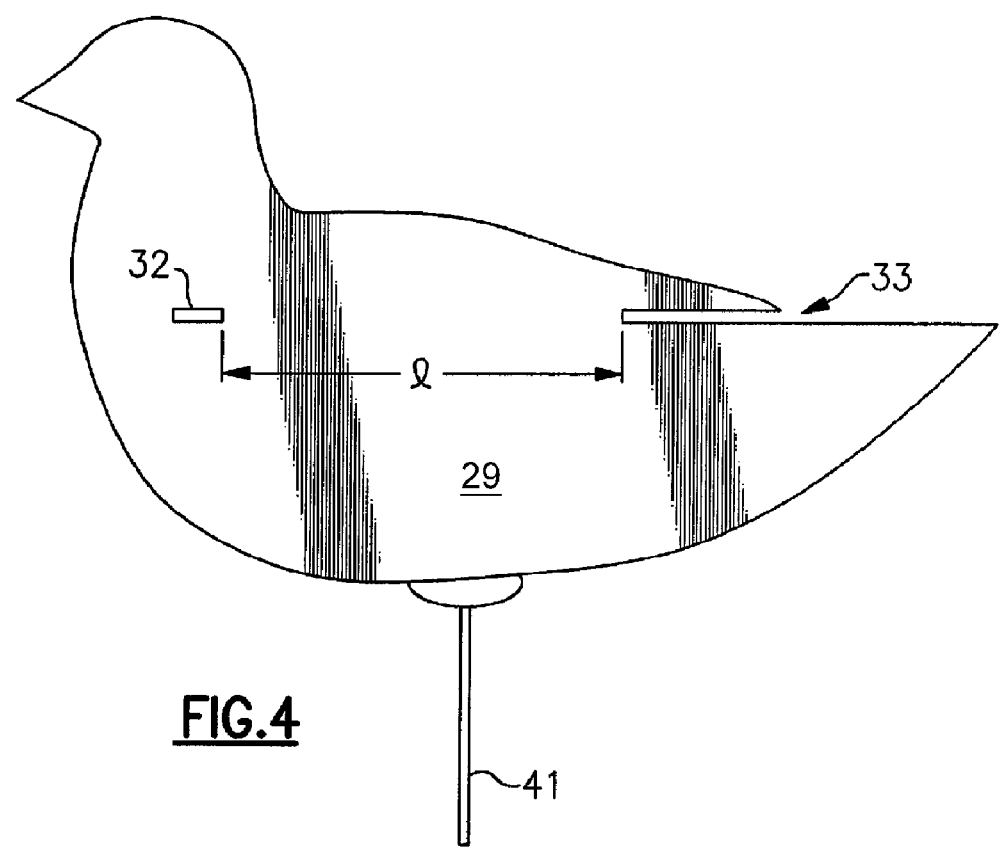
FIG. 4 is a side dorsal view of a vertically orientated portion thereof in accordance with another embodiment of the invention.
Figure 5:
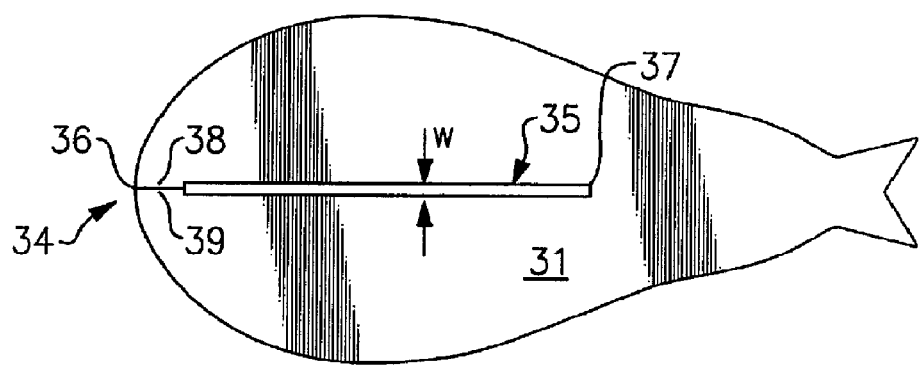
FIG. 5 is a top dorsal view of the horizontally disposed portion of the alternative embodiment.

Referring now to FIGS. 4 and 5, an alternative design is shown for a decoy wherein the body member 29 is a planar member formed to represent the longitudinal side view of a pigeon, and the wing member 31 is a planar member formed to represent a top longitudinal view of the wing portion of a pigeon. The body section 29 includes an opening 32 near its longitudinal front end and a slot 33 near its rear end. The distance between the two is shown by the dimension "l".

The wing section 31 includes a slit 34 which extends from a point 36 at its front end to a point 37 near its rear end. Again, the open portion 35 of the slit 34, which is to contain the portion of the body member 29, has a width "w" which is sufficient to allow the thickness of the body section 29 to be disposed therein, and a length which is greater then the dimension "l". As will be seen, at the forward end of the slit 34 there is little or no separation between the sides of the slit 34 such that a pair of tabs 38 and 39 are formed, with each extending transversely toward the slit 34. As an alternative, the forward part of slit 34 can be that as shown in FIGS. 2 and 3, such that a single tab extends from one side of the slit rather than one from each side. To accommodate assembly of the open portion 35 of the slit it must have a length that is greater than the dimension "l".

Assembly of the two components is similar to the assembly as described hereinabove. The two lateral sides of the wing section 31 are slightly separated at the slit 34 and the wing section 31 is placed over the body section 29, first by inserting the point 37 into the slot 33 and then inserting the tabs 38 and 39 into the opening 32. The assembled decoy with its pin 41 can then be placed into the socket 28 of a stake 27 as described hereinabove. Disassembly can be easily accomplished by reversing the process.

While the present invention has been particularly shown and described with reference to certain exemplary embodiments, it will be understood by a skilled artisan that various changes in detail can be affected therein without departing from the spirit and scope of the invention as defined by claims that can be supported by the written description and drawings. For example, although the decoys shown are made to represent a goose and a dove, they can be made to represent any species such as ducks, crows, turkeys or the like. Also, even though the slots 17 and 33 have been shown at the rear, and the openings as being forward thereof, these could be reversed. Further, where exemplary embodiments are described with reference to a certain number of elements it will be understood that the exemplary embodiments can be practiced utilizing less than the certain number of elements.

I claim:

1. A game bird decoy comprising:
    a planar body member for placement in a substantially vertical orientation, said body member having two ends with at least one opening formed near one end of said two ends and an open longitudinally extending slot formed at an other end of said two ends, with said at least one opening and said slot being separated by a fixed dimension;
    a planar wing member for placement in a substantially horizontal orientation, said wing member being composed of a light-weight semi-rigid material and including a slit extending from one longitudinal end of said wing member, said slit dividing said one longitudinal end of said wing member into opposing right and left sides, said slit being of a length which is greater than said fixed dimension so as to extend between said at least one opening and said slot when said wing member is assembled with said body member;
    at least one tab partially formed by said slit, said tab formed and disposed so as to be received in said at least one opening when said wing member is assembled with said body member; and
    a vertical support member attached to said planar body member and adapted to be inserted into the ground;
    wherein said slit is configured to permit separation of said opposing right and left sides of said planar wing member at said one longitudinal end,
    wherein the separation permits the planar wing member to slide transversely over the planar body member through said one longitudinal end, thereby positioning a rear point of said slit in said slot and positioning said at least one tab into said at least one opening, and
    wherein said at least one tab is proximate the one longitudinal end and extends across a centerline of the planar wing member.

2. A game bird decoy as set forth in claim 1 wherein said at least one opening is formed near said one end which comprises an anterior end of said body member and said slot is formed in said other end which comprises a posterior end of said body member.

3. A game bird decoy as set forth in claim 1 wherein said wing member is composed of a corrugated plastic material.

4. A game bird decoy as set forth in claim 1 wherein said body member is formed of a corrugated plastic material.

5. A game bird decoy as set forth in claim 1 wherein said at least one opening in said body member comprises a plurality of openings and said at least one tab on said wing member comprises a plurality of tabs which correspond with the openings in said body member.

6. A game bird decoy as set forth in claim 1 wherein said wing member includes a color pattern disposed on a top surface thereof and presenting the appearance of a particular species of bird.

7. A game bird decoy as set forth in claim 1 wherein said vertical support member includes a pin affixed to said body member and extending downwardly therefrom, said pin comprising a downwardly extending end being adapted to be rotatably received in a socket disposed on a top end of a stake to be inserted into the ground.

\* \* \* \* \*